No. 753,992. PATENTED MAR. 8, 1904.
F. A. MARCHER.
LAPIDIST'S FACET CUTTING INSTRUMENT.
APPLICATION FILED NOV. 1, 1902.
NO MODEL. 3 SHEETS—SHEET 1.
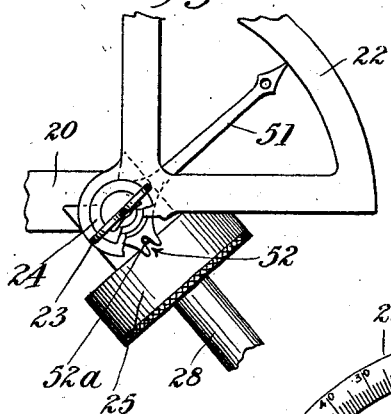
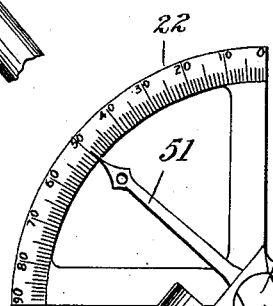
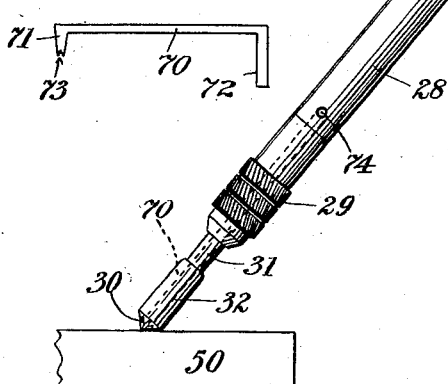
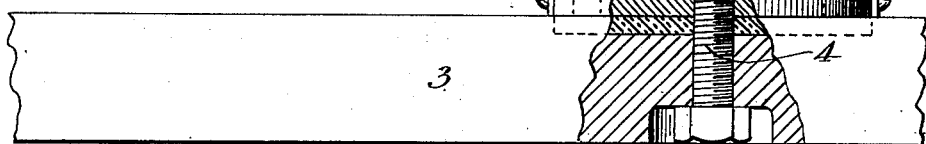
Witnesses
Inventor
Frank Albion Marcher No. 753,992. PATENTED MAR. 8, 1904.
F. A. MARCHER.
LAPIDIST'S FACET CUTTING INSTRUMENT.
APPLICATION FILED NOV. 1, 1902.
NO MODEL. 3 SHEETS—SHEET 2.
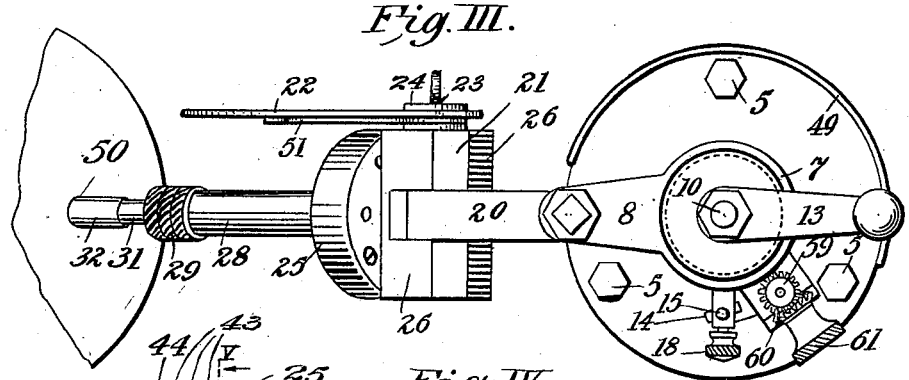
Fig. III.
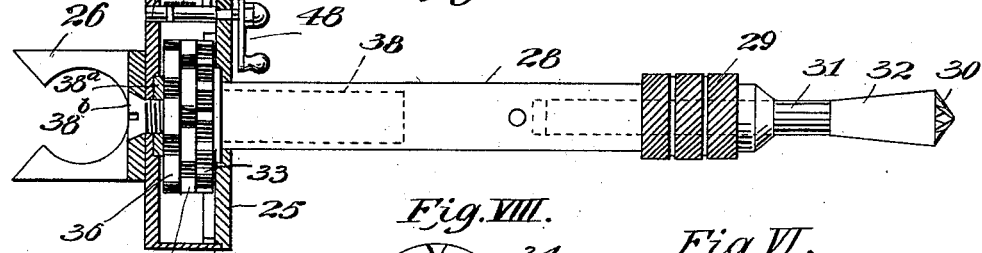
Fig. IV.
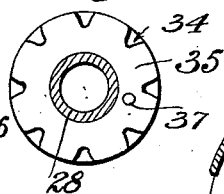
Fig. VIII.
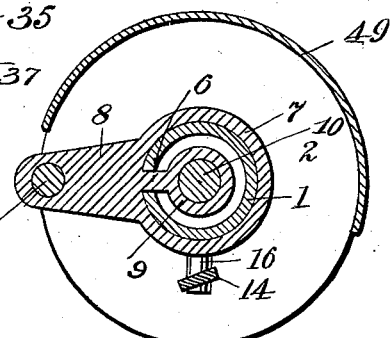
Fig. VI.
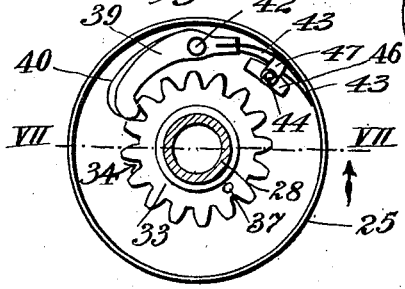
Fig. V.
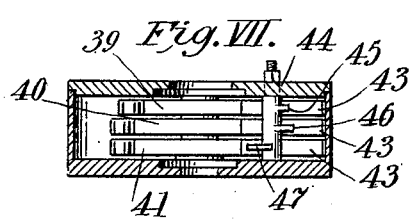
Fig. VII.
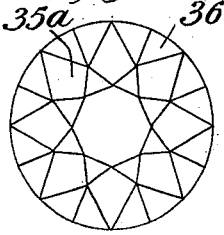
Fig. IX.
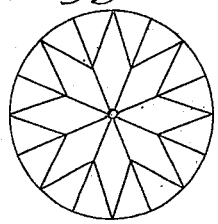
Fig. X.
Witnesses
Edmund A. Strauss.
George T. Hackley
Inventor
Frank Albion Marcher
by Townsend Bro.
his atty.

No. 753,992. PATENTED MAR. 8, 1904.
F. A. MARCHER.
LAPIDIST'S FACET CUTTING INSTRUMENT.
APPLICATION FILED NOV. 1, 1902.
NO MODEL. 3 SHEETS—SHEET 3.
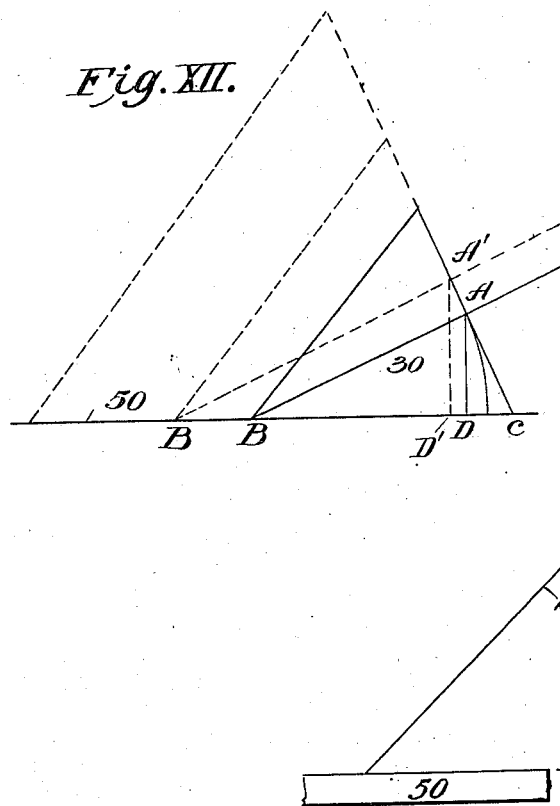
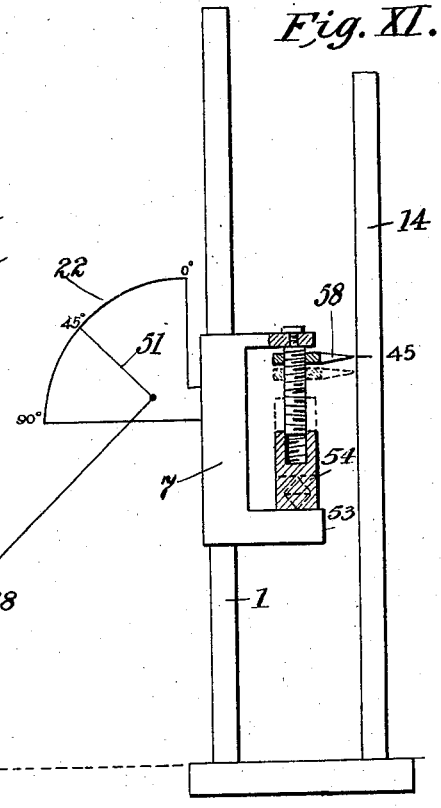
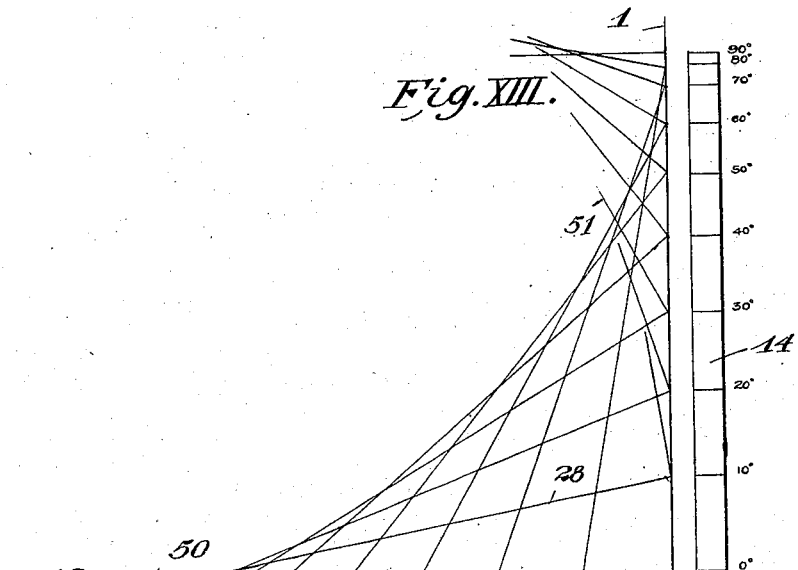

No. 753,992.

Patented March 8, 1904.

UNITED STATES PATENT OFFICE.

FRANK ALBION MARCHER, OF LOS ANGELES, CALIFORNIA.

LAPIDIST'S FACET-CUTTING INSTRUMENT.

SPECIFICATION forming part of Letters Patent No. 753,992, dated March 8, 1904.

Application filed November 1, 1902. Serial No. 129,755. (No model.)

*To all whom it may concern:*

Be it known that I, FRANK ALBION MARCHER, a citizen of the United States, residing at Los Angeles, in the county of Los Angeles and State of California, have invented a new and useful Lapidist's Facet-Cutting Instrument, of which the following is a specification.

My invention relates to an instrument for holding precious stones in various positions and angles relatively to the lap to enable the lapidist to accurately cut the facets without having recourse to templets or other devices for measuring the angles.

The object of my invention is to provide a device of the character described by means of which stones may be cut by a person of ordinary skill as perfectly as is now done by the most skilful lapidist.

Referring to the drawings, Figure I is a side elevation of the instrument with portions of the standard broken away to show the interior thereof. Fig. II is a rear elevation of the quadrant, a portion being broken away to show how the hand is connected with the lug. Fig. III is a plan view of what is shown in Fig. I. Fig. IV is a side elevation of the arbor and index-box, the latter being in section. Fig. V is a transverse view taken through the index-box on line V V of Fig. IV. Fig. VI is a horizontal sectional view taken through the standard of the instrument. Fig. VII is a sectional view taken on line VII VII, Fig. V, looking in the direction of the arrow, the index-plates being removed. Fig. VIII is a detail of an index-plate. Fig. IX is a diagram illustrating the top view of the brilliant cut. Fig. X is a diagram showing the under side of the brilliant cut. Fig. XI is a diagrammatical view of the instrument, illustrating the calipering of a stone and showing in dotted lines the adjustment of the registering devices as thus determined. Fig. XII is a diagram illustrating relations of the graduations on the vertical scale to the angle of inclination of the arbor. Fig. XIII is a diagram illustrating the relation of the diameter of the stone to the height of the pivot of the arbor above the grinding-surface of the lap. Fig. XIV is a detail of the girdle-gage.

The instrument comprises substantially a standard, with which means for holding a stone is flexibly connected, in combination with suitable gages for the determination of the different positions for holding the stone relatively to the lap for cutting the facets.

1 designates a main post or standard which serves as a support for the carrier of the stick-holder and projects upwardly from a base-plate 2, which latter rests upon a base 3.

4 designates a screw which passes through the base 3 into the base-plate 2 and secures the same together, holding the standard in an upright position.

5 designates adjusting-screws in the base-plate 2. Three of these screws may preferably be employed spaced at equal distances apart, and by loosening the screw 4 the standard 1 may be tilted in either direction and made plumb by screwing down an appropriate adjusting-screw. The standard 1 having been adjusted plumb, the screw 4 may be tightened again to retain the standard in position. The standard 1 is tubular and provided along one side with a longitudinal slot 6.

7 designates a sleeve which serves as a carrier for the stick-holder and is movable transversely to the plane of the lap and is provided with a pair of opposite horizontal lugs 8, which project outwardly, and with a lug or stationary nut 9, which extends into the interior of the tubular standard, as shown in Fig. I and Fig. VI.

10 designates a screw inside the standard 1, which is revolubly mounted in a bearing 11 at the upper end of the standard 1. The screw 10 is provided with a shoulder 12, which bears against the under side of the bearing 11. Mounted upon the upper end of the screw 10 is a crank 13, by means of which the screw may be rotated. The screw 10 passes through the nut 9 of the sleeve 7. Thus by rotating the screw 10 the sleeve 7 may be adjusted to any desired height on the standard 1.

14 designates a scale which is provided at each end with pin extensions 15. The lower pin 15 is slidably mounted in a lug 16, which projects from the standard 1. The upper pin 15 is mounted in a lug which projects from the upper end of the standard.

18 is a thumb-screw for clamping the pin 15, and thereby holding the scale 14 in position. The pins are of sufficient length to allow of the scale being adjusted to the right position relatively to the grinding-surface of the lap and to allow compensating for the wear of the lap.

19 is a bracket pivotally mounted between the lugs 8 to swing in a horizontal plane. The bracket 19 is provided with a horizontal arm 20, to the end of which is attached a horizontal shaft 21. The shaft 21 is flattened, as shown. Mounted upon one end of the shaft 21 is a quadrant 22. The quadrant 22 is adjustably attached to the shaft 21 by means of a thumb-nut 23. (See Fig. II.) Interposed between the thumb-nut 23 and the hub of the quadrant is a washer 24. The face of the quadrant is marked into divisions representing degrees, there being ninety degrees represented, indexed by designating-numbers. By loosening the thumb-nut 23 the quadrant may be adjusted so that the division-mark "90°" will be on a horizontal line passing through the center of the shaft 21.

25 designates a box for housing the index-disks about to be described. The box 25 has attached to it a pair of perforated lugs 26, which are mounted upon the shaft 21. (See Figs. I and III.) The end of the lugs 26 are cut away, as at 27, to allow of connecting the box to the shaft or for removing the same from the shaft by tilting the lugs to bring the opening 27 into register with the narrow face of the shaft. In other words, each lug is provided with a concave recess which embraces more than one hundred and eighty degrees. An arbor 28 is rotatably mounted in the box 25. The outer end of the arbor 28 may be provided with a chuck 29 for holding a mandrel 31, upon which the stone to be cut is mounted.

30 designates a stone which may be mounted on the end of the mandrel 31 by means of wax 32. The mandrel 31 is held in the chuck 29.

The upper end of the arbor 28 passes through the box 25, and mounted upon its end are a series of index-disks—in this embodiment three in number. 33 designates one disk which is provided with sixteen notches 34 in its periphery. 35 designates another disk mounted upon the arbor 28 and next to the disk 33. The periphery of the disk 35 is provided with eight notches 34, each notch being placed at a point midway between the centers of the notches in the disk 33. 36 designates another disk which is likewise provided with eight notches, (see Fig. VIII,) each notch being half-way between the notches on the disk 35. The three index-disks 33, 35, and 36 are shrunk on the arbor 28 and held from moving relatively to each other by means of a pin 37, which passes through all three disks.

38 is a stationary shaft provided with a head or shoulder 38$^a$, which is held in a recess in the head of the box 25.

38$^b$ is a screw which passes through the box 25 and into the shaft 38 and holds the latter against the head of the box 25 and perpendicular thereto.

The arbor 28 is hollow and is mounted on the shaft 38, the latter holding the arbor true to its axis and stiffening and reinforcing the joint between the arbor and box 25.

I have provided means for frictionally locking the arbor 28 at definite points in its rotation, which embraces in my preferred form a series of three detents 39 40 41. Each detent is mounted to rock upon a pin 42, which is supported by the box 25. Each detent is provided with a spring 43, which bears against the inside of the box 25.

44 designates a shaft mounted in the box underneath the springs 43, which is provided with three cams, one of which cams, 45, has a plane of movement under the spring of the detent 39. The cam 46 has a plane of movement under the spring of the detent 40, the cam 47 having a plane of movement under the spring of the detent 41. One end of the shaft 44 extends through the box 25 and has attached thereto a crank 48, by means of which the shaft may be rotated to bring a certain cam against a certain spring to press the proper detent against the index containing the desired number of notches. The outside of the box 25 is indexed to indicate the position which the crank 48 must take in order to bring the proper detent into action. By rotating the crank 48 and bringing the cam 47 to bear against the under side of the spring-detent 39 the spring will be flexed, as shown in Fig. V, and the detent thereby tilted, so that its rounded end will press against the periphery of the disk 33 and engage with the notches in the disk as they come in front of the detent, the latter yieldingly holding the disk from rotation. Either of the detents may be brought into operative relation with their respective disks by rotating the crank 48 to the proper position.

49 is a shield which is mounted on the base-plate 2 and extends the entire length of the standard 1 to protect the device from particles flying from the revolving lap.

50 designates a lap.

The stone 30 having been roughly ground into the approximate shape, it is mounted on the end of the mandrel 31, as before described. The mandrel 31 is then mounted in the chuck 29.

The angle of inclination of the arbor 28 is indicated by a pointer or hand 51, which is pivoted on the shaft 29.

Referring to Fig. II, it will be seen that the hub of the hand 51 is provided with a slot 52. A pin 52$^a$ projects from a lug 26 into the slot 52, and the hand 51 is thus held at right angles to the axis of the arbor 28. The hand 51 indicates on the scale 22 the angle of inclination of the arbor 28, and consequently enables the lapidist to secure the right pitch of facet on the stone 30.

The sleeve 7 having been adjusted to the proper height on the standard 1, the arbor 28 may be grasped by the hand of the lapidist and the stone 30 brought into contact with the lap 50 and pressed against the same. The arbor slowly swings downward as the grinding proceeds, and the hand 51 slowly moves over the scale on the quadrant 22. The lapidist continues grinding until the hand 51 has come opposite the proper graduation on the quadrant, which indicates that the stone has been ground sufficiently to produce the facet at the proper angle. The lapidist then tilts up the arbor, thus moving the stone away from the lap, and rotates the arbor 28 one notch to bring another part of the stone into position for cutting. In producing the brilliant cut the top of the stone is first cut with eight facets 35ª, and the disk 35, which is provided with eight notches, is the one which is first employed. After the first set of facets has been cut the crank 48 is moved into the proper position so that the detent 41 will be brought into operative relation with the disk 36 and a second set of facets 36ª cut, each facet 36ª cutting off the adjacent edges of contiguous facets of the first series 35ª. After the facet is cut the arbor is turned by the lapidist sufficiently to allow the detent to drop in the next notch, and the stone is thereby revolved one-eighth of a revolution as for the first set, and the operator then tilts down the arbor and presses the stone upon the lap and grinds the second facet. When the second facet has been formed, the lapidist again rotates the arbor another notch, and so on until the entire set of eight facets forming the second set are completed. The operator then moves the crank 48 to bring the next disk 33, having sixteen notches, into operation with the detent 39. The third set of facets is ground in a manner similar to that which has just been described, except that the arbor is revolved one-sixteenth of a revolution between each facet. The third set of facets are cut at points midway between the first facets cut. After the second set of facets has been cut and the handle 48 turned so as to bring the disk having sixteen notches into operation, as described, the lapidist is enabled to accurately revolve the stone into the sixteen positions necessary to produce the sixteen different facets. By means of the three different disks, two of them having eight notches and the other having sixteen notches, any of the cuts known to the lapidist's art may be secured. Each set of facets lies in planes at different angles. The first set cut is usually given a pitch of forty-nine degrees.

In order to determine the proper height at which to place the shaft 21, I have provided a calipering device, as follows:

53 is a lug mounted on the sleeve 7.

53ª is a perforated lug mounted on the sleeve 7 above the lug 53. Slidably mounted in the lug 53ª is an internally-threaded stem 53ᵇ, provided with a head 54 at its lower end.

A screw provided with right and left threads 55 and 56 is rotatably mounted in a lug 57, which projects from the sleeve 7. The lower threads of the screw are left-hand threads and upper threads are right-hand threads. The ratio of the pitch of the upper set of threads to the pitch of the lower set is as twenty to nine.

58 is an index-finger which is screw-threaded and mounted upon the fine threads 56. One end of the finger 58 is notched and slides over the edge of the scale 14.

Rigidly mounted upon the upper end of the screw 56 is a bevel-gear 59.

60 is a bevel-gear which is rotatably mounted on the lug 57 and which meshes with the bevel-gear 59.

61 is a knurled nut for revolving the gear 60.

By revolving the gear 60 the gear 59 is rotated, and the screw-threads 56 and 55 are thereby revolved, and as the screw is revolved the stem 53ᵇ is moved through the lug 53ª. At the same time the index-finger 58 is propelled by the fine threads 56 over the scale 14. When the gear 60 is revolved counter-clockwise, the index-finger 58 is moved up the scale 14, and the stem 53ᵇ and its head 54 are moved down toward the lug 53.

The diameter of the stone is determined by calipering it between the lug 53 and the head 54, the head 54 being brought into contact with the girdle of the stone by rotating the knurled nut 61, as before explained. While the diameter of the stone is thus being determined the index-finger 58 also moves over the scale 14 and is brought into a definite position above the upper surface of the lap. The graduations on the scale 14 are properly arranged relatively to the upper face of the lap 50. It will be noted that the graduations on the scale are made closer together at the top of the scale and widen out toward the bottom. The reason of this will appear on referring to Fig. XIII, where the scale 14 is indicated at the right, and the lines 28 at the left indicate the various positions of the stick-holder corresponding to the different angles to be cut, 51' being the corresponding positions of the indicating-arm 51. In all these various positions the stick-holder is supposed to come down to the lap 50, as shown, so there will be no allowance for thickness of the gem, and it will be understood that in practice the stick-holder will be raised by the operation of the screw 10, as above explained, to allow for the thickness of the particular stone being operated upon. The successive lines 28 in Fig. XIII differ in direction by equal angular increments, and said lines are all of equal length, representing the length of the stick-holder, stick, and gem. When the angle of the stick-holder with the horizontal is small, it will require a large vertical elevation of the stick-holder to produce a given angular variation therein, and as the stick-holder is tipped up more and more the amount of rise required for a given angular variation is successively diminished, as shown. When the stone has been calipered, the crank 13 should be rotated to adjust the sleeve 7 and bring the index-finger 58 opposite the graduation on the scale 14 which corresponds to the graduation on the quadrant which represents the degree at which the arbor should stand with the completed facet resting flatly on the grinding-surface of the lap. In giving a specified cut to the stone each series of facets are formed at definite angles to the axis of the stone, and the angle at which the arbor should stand relatively to the lap when the facet is completed and resting on the surface of the lap may be determined by the lapidist from the graduations marked on the quadrant.

It is evident that when a stone of large diameter is being cut in order to attain the proper angle of facet without grinding away the girdle and reducing the diameter of the stone the center of the shaft 21 should be higher above the surface of the lap than when a stone of small diameter is being cut.

Fig. XI shows the calipering device closed, the head 54 being in contact with the lug 53. When thus closed, the arbor contacts with the lap (see dotted-line position) and the diameter of a stone would be *nil*. To produce a certain diameter of the stone, the pivotal point of the arbor must be raised. Thus to determine the amount the pivotal point of the arbor is to be raised the stone as roughed out is calipered, as shown in Fig. XII, the finger 58 being thereby moved over the scale 14 a distance equal to the ratio of twenty to nine between the two sets of threads, the head 54 traveling the full diameter. Then the pivotal point of the arbor is raised by rotating the crank 13 until the finger 58 is brought opposite the graduation representing the angle which is to be indicated on the quadrant when the facet is completed. It is obvious that to preserve the angle the pivotal point of the arbor should really be raised a less distance than half the diameter of the stone, as a glance at Fig. XII will demonstrate. 30 represents the stone, and let A B C represent the angle. A D is the sine of the angle. A B is the radius. Theoretically the pivotal point of the arbor should be moved up a distance equal to the sine A D of the angle instead of being moved up a distance equal to the distance A C, as is the actual practice. Thus theoretically in adjusting for a larger stone, as shown by dotted lines, the pivotal point of the arbor would be moved up a distance A' D'; but in practice the results are attained sufficiently accurately by adjusting according to the diameter and constructing the threads at the ratio mentioned—sixteen to nine—which will adjust the pivotal point at a point relatively above the lap substantially equal to the sine A D of the angle forty-nine degrees. The object of calipering the stone is to determine the height of the pivotal point of the arbor, and thereby determine the angle at which the arbor should stand when cutting the first set of facets. The angle of the first set having been determined as set forth, the other angles may be then determined by the judgment of the lapidist, as they have a definite ratio to the first set cut. The lapidist may vary the angles of the other sets according to his customary ideas or to suit the particular stone which he is cutting. Different stones require different angles of facets to produce the best results.

It is obvious that the girdle of the stone when cutting either the top or bottom facet should lie at the same distance from the pivotal point of the arbor. Fig. XIV shows a girdle-gage comprising a shank 70 and two arms at right angles thereto, 71 and 72. The arm 71 has a notch, as at 73. In positioning the stone the arm 72 is inserted in a hole 74 in the arbor and the notch 73 takes in the girdle of the stone, the mandrel 31 being clamped by the chuck when the stone is positioned. The girdle-gage may be slipped out when not in use. Its application is indicated by dotted lines in Fig. I.

It should be understood that I reserve the right to make such alterations and changes in the herein-described embodiment of my invention as come within the scope of the claims.

Having described my invention, what I claim, and desire to secure by Letters Patent of the United States, is—

1. In a facet-cutting instrument, a stationary tubular standard, a sleeve mounted on the standard, a part projecting from said sleeve into said standard, means for holding a stone flexibly connected with said sleeve, and means inside said standard engaging said part for raising and lowering said sleeve.

2. In a facet-cutting instrument, a stationary tubular standard, a sleeve mounted on the standard, a part projecting from said sleeve into said standard, a bracket pivoted to said sleeve to swing horizontally, means for holding a stone flexibly connected with said bracket, means indicating the angularity of said holding means, and means inside of said standard engaging said part for raising and lowering said sleeve.

3. In a facet-cutting instrument, a stationary tubular standard, a sleeve slidably mounted on said standard, a part projecting from said sleeve into said standard, means for holding a stone flexibly connected with said sleeve, means inside of said standard engaging said part for raising and lowering said sleeve and means for indicating the position of said sleeve relatively to the standard.

4. In a facet-cutting instrument, a stationary tubular standard, a sleeve on the standard, a part projecting from said sleeve into said standard, means for holding a stone flexibly connected with the sleeve, means for indicating the angularity of the holding means, and means inside of said standard engaging said part for raising and lowering the sleeve.

5. In a facet-cutting instrument, a stationary tubular standard having a longitudinal slot, a sleeve on said standard, means for holding a stone flexibly connected with the sleeve, a screw rotatably mounted inside said standard, a projection from said sleeve passing through said slot and engaging said screw, and means for rotating said screw.

6. In a facet-cutting instrument, a stationary tubular standard having a longitudinal slot, a sleeve on said standard, means for holding a stone flexibly connected with the sleeve, a screw rotatably mounted in said standard, a projection from said sleeve, passing through said slot and engaging said screw and means for indicating the position of the sleeve relatively to the standard.

7. In a facet-cutting instrument, a stationary tubular standard having a longitudinal slot, a sleeve slidably mounted on the standard, a screw rotatably mounted in the standard, a projection from said sleeve passing through said slot and engaging said screw, a bracket pivoted to the sleeve to swing horizontally, an arbor pivoted to the bracket to swing vertically and means on said arbor for holding a stone.

8. In a facet-cutting instrument, a stationary tubular standard having a longitudinal slot, a screw rotatably mounted in said standard, a sleeve slidably mounted on said standard, a projection from said sleeve passing through said slot and engaging said screw, a bracket pivoted to the sleeve to swing horizontally, a shaft carried by the bracket, an arm pivotally mounted on the shaft and removable from the shaft and means carried by the arbor for holding a stone.

9. In a facet-cutting instrument, rotatable means for holding a stone and means for frictionally holding said rotatable means at various spaced points in its revolution.

10. In a facet-cutting instrument rotatable means for holding a stone and means for frictionally holding said rotatable means at predetermined points of the revolution thereof.

11. In a facet-cutting instrument, a standard, a sleeve mounted on said standard, a bracket mounted in the sleeve, means for holding a stone connected with a bracket and rotatable with respect thereto, and means for frictionally holding said holding means from rotation.

12. In a facet-cutting instrument, a standard, a sleeve mounted on the standard, a bracket mounted on the sleeve, means for holding a stone connected with the bracket and rotatable with respect thereto, means for frictionally locking said holding means from rotation, a scale mounted on the bracket and a hand connected with the holding means and movable over the scale.

13. In a facet instrument, a standard, a sleeve slidably mounted on the standard, a bracket pivoted to the sleeve, a stationary shaft fixed on the bracket, an arbor pivotally connected to the shaft, said shaft being flattened, said arbor being provided with a concave bearing-face embracing more than one hundred and eighty degrees permitting the removal of the arbor from the shaft and means carried by the arbor for holding the shaft.

14. In a facet-cutting instrument, a standard, means for adjusting said standard to a plumb, means for holding a stone connected to the standard and means for indicating the position of the holding means.

15. In a facet-cutting instrument, a standard, a sleeve mounted on the standard, a bracket pivoted to the sleeve to swing horizontally, a flattened shaft on the bracket, means for holding a stone, an index-box connected to said holding means, a lug projecting from the index-box, said lug having a concave recess embracing more than one hundred and eighty degrees and being removably carried by the shaft.

16. In a facet-cutting instrument, a standard, a sleeve slidably mounted on the standard, a bracket pivoted to the sleeve to swing horizontally, an arm projecting horizontally from said bracket, a horizontal shaft fixed on said arm, means for holding a stone, an index-box, one end of said holding means being rotatably mounted in said index-box said index-box being hung on said shaft but removable therefrom and means in said index-box for frictionally locking said holding means from revolution.

17. In a facet-cutting instrument rotatable means for holding a stone, means for indicating the position of the holding means embracing an index-plate provided with peripheral notches and a spring-catch detent for frictionally engaging said notched index-plate.

18. In a facet-cutting instrument rotatable means for holding a stone embracing a series of notched index-plates, a series of spring-pressed detents frictionally bearing against the peripheries of said index-plates and means for throwing said detents into and out of operation, the notches of the index-plates having walls which diverge toward the periphery, the portions of said detents which bear against the walls of the notches being rounded, the index-plates springing out the detents when sufficient force is imparted to turn the index-plates.

19. In a facet-cutting instrument, a standard, a sleeve mounted on the standard, means for holding a stone flexibly connected with the sleeve, a scale mounted on the standard, a calipering device embracing a stationary and a movable member, a finger, means for simultaneously moving the movable member in one direction and the finger in the reverse direction over said scale at a variant speed.

20. In a facet-cutting instrument, a standard, a sleeve on the standard, means for holding a stone flexibly connected to the sleeve, a pair of lugs mounted on the frame, a hollow threaded stem slidably mounted in one of said lugs, a screw provided with right and left threads rotatably mounted on the sleeve, one set of threads engaging said stem and a finger mounted on the other part of said sleeve engaging the other threads, one end of said finger being notched and sliding over the scale.

21. In a facet-cutting instrument, a standard, a sleeve slidably mounted on the standard, a bracket pivoted to the sleeve, an index-box pivoted to the bracket, an arbor rotatably mounted in the index-box, means on the free end of the arbor for holding a stone, a set of index-plates provided with notches in their peripheries mounted on the end of the arbor within said index-box, a set of pivoted detents in said box for controlling the movement of said index-plates, a shaft mounted in said box and provided with a series of revoluble cams, each of said cams being movable into contact with the spring of a detent.

22. In a facet-cutting instrument rotatable means for holding a stone, means for regulating the degree of rotation of said holding means consisting of a set of index-plates provided with notches in their peripheries, one of said index-plates having more notches than the other, the notches of one of said index-plates being arranged equidistant between the notches of another plate and means for frictionally engaging said index-plates within the notches.

23. In a facet-cutting instrument, a base, a base-plate mounted on said base, a standard secured to said base-plate, means engaging the central portion of said base-plate to secure said base-plate to said base, and a plurality of adjusting-screws carried by said base-plate and engaging the base to adjust the standard to a plumb position.

24. In a facet-cutting instrument, a stationary standard, a carrier mounted on the standard, means for holding a stone flexibly connected with said carrier, a scale carried by said standard and extending longitudinally of said carrier, a calipering device carried by said carrier and having a hand to coöperate with said scale, and means for vertically moving said carrier.

25. The combination with a lap, of a support arranged in definite relation thereto, a carrier movable on said support, transversely to the plane of the lap, calipering means on the carrier for calipering a stone, indicating means mounted movably with respect to the carrier and connected to be operated by said calipering means, a scale mounted on the said support and coöperating with said indicator, and a stone-carrying arm pivoted to said carrier.

26. The combination with a lap, of a support arranged in definite relation thereto, a calipering means for measuring a stone to be ground, a carrier movably mounted on said support, a stone-holding arm pivoted on the carrier, and indicating means connected to the said carrier and to the calipering means to enable the position of the stone-holding arm to be varied.

27. The combination with a lap, of a support arranged in definite relation thereto, a calipering means for measuring a stone to be ground, a carrier movably mounted on said support, a stone-holding arm mounted on the carrier, and indicating means connected to the said carrier and to the calipering means to enable the position of the stone-holding arm to be varied in accordance with the diameter of the stone.

28. The combination with a lap, of a support arranged in definite relation thereto, a carrier movable on said support transversely to the plane of the lap, a screw engaging and moving the carrier, a stone-carrying arm pivoted to the carrier, caliper means for measuring a stone, and indicating means connected to the carrier and to the calipering means for enabling the carrier to set in accordance with the diameter of the stone, and indicating means connected to said arm and carrier for indicating their relative angular position.

In testimony whereof I have signed my name to this specification, in the presence of two subscribing witnesses, at Los Angeles, in the county of Los Angeles and State of California, this 25th day of October, 1902.

FRANK ALBION MARCHER.

Witnesses:
GEORGE T. HACKLEY,
JULIA TOWNSEND.